June 24, 1947.   K. M. HUSTON   2,422,903
PROCESS FOR ELECTROLYTICALLY TREATING STAINLESS STEEL ARTICLES
Filed April 21, 1944
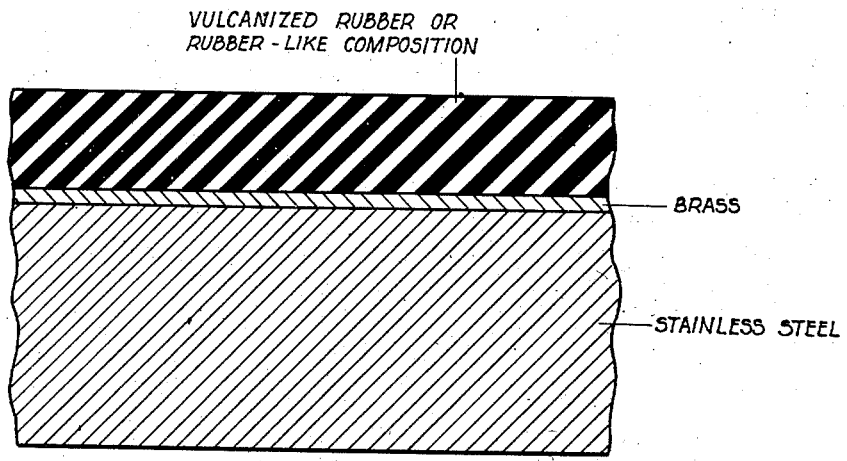
INVENTOR.
K. M. HUSTON
BY
ATTORNEY

UNITED STATES PATENT OFFICE 2,422,903

PROCESS FOR ELECTROLYTICALLY TREATING STAINLESS STEEL ARTICLES

Kenneth M. Huston, Baltimore, Md., assignor to Western Electric Company, Incorporated, New York, N. Y., a corporation of New York Application April 21, 1944, Serial No. 532,182

1 Claim. (Cl. 204—34)

This invention relates to a process for electrolytically treating stainless steel articles and particularly to a process for electrolytically treating stainless steel articles for the purpose of producing composite articles having a stainless steel base to which a body of a vulcanized composition, such as rubber, is firmly secured.

This application is a continuation-in-part of my copending application Serial No. 432,149, filed February 24, 1942.

Stainless steel is used for many purposes where its strength and resistance to corrosion are factors. It is frequently desirable to bond a body of rubber or rubber-like material to a stainless steel part to provide the part with a wear-resistant, resilient or cushioning element.

Thus, it is desirable to use stainless steel pulleys in corrosive atmospheres and, since rubber resists abrasion better than does stainless steel, to have the grooves of the pulleys covered with a rubber composition to increase the life of the pulleys. Also, it would be feasible to make resilient automobile engine mounts consisting of stainless steel members designed to be secured to an automobile frame, and a block of rubber composition bonded thereto as a cushioning support for the engine. Another use for stainless steel bodies having rubber or rubber-like bodies bonded thereto is in the manufacture of stratosphere planes. The fuselage sections of such planes could be made of stainless steel and resilient gaskets of rubber or rubber-like materials could be vulcanized to one of the sections at the junctions thereof with other sections to form pressure-tight joints therebetween.

Thus, the need for composite articles comprising stainless steel parts having rubber or rubber-like bodies firmly adhered thereto is apparent. However, it has not been possible by previously known methods to effect a permanent and strong bond between stainless steel and compositions containing rubber or rubber-like materials.

The object of this invention is to provide a new and useful process for electrolytically treating stainless steel articles.

In accordance with one embodiment of the invention, a stainless steel body is cleaned by making it an electrode in an electrolytic cell in which the electrolyte consists of an aqueous solution of fluosilicic acid, then to electroplate a coating of brass on the stainless steel body, to place a body of unvulcanized vulcanizable compound, such as a rubber composition, in contact with the brass plate and to vulcanize the compound upon the brass plate.

The above-described and other objects and features of the invention will be apparent from the following detailed description of a specific embodiment of the invention, taken in conjunction with the accompanying drawing, in which the single figure represents a fragmentary cross section of a composite article embodying the invention.

The ordinary stainless steels of commerce are alloys of iron and chromium, or of iron, chromium and nickel, with small amounts of carbon. The usual stainless steel alloys contain from about 10% to about 30% of chromium and from a trace to about 15% of nickel. Sometimes from about 2% to about 4% of molybdenum is added to the chromium-nickel alloys to impart additional corrosion resistance to the alloys. Alloys of these several types are the ones that are intended to be embraced by the term "stainless steel" as employed herein and in the annexed claim.

Example I

A body of stainless steel containing 18% of chromium and 8% of nickel was made the anode in a direct current electrolytic cell in which the electrolyte was a 10% solution of fluosilicic acid in water. The stainless steel body was electrolyzed therein at a current density of about 430 amperes per square foot for one minute, while the bath was maintained at room temperature. This treatment effected a thorough cleaning of the surface of the stainless steel body and removed any grease, dirt or oxide film that was on the surface prior to this treatment.

The body was then washed thoroughly with water and, while still wet, was immersed in and made the cathode in an alkaline cyanide brass plating bath containing 6.9 ounces per gallon of copper, 0.9 ounce per gallon of zinc, 3.7 ounces per gallon of uncombined sodium cyanide, and 11.3 ounces per gallon of sodium carbonate. The pH of this bath was 10.9, and the temperature was maintained at about 90° F. By this treatment the part was given a coating of brass containing approximately 75% of copper. The electrolysis was continued until the surface of the body immersed in the bath was completely covered with a thin coating of brass. After a brass plate of sufficient thickness was plated upon the body, it was removed from the brass plating bath, thoroughly washed with water and dried.

A body of a rubber composition was then placed in contact with the brass plated portion of the body, and was vulcanized in contact with the brass plating under heat and pressure. The exact constitution of the rubber composition may vary, but it is advisable to employ a rubber composition containing at least 4.0% of sulphur on the basis of the rubber content of the composition in order to insure firm adhesion between the vulcanized rubber composition and the stainless steel body through the action of the interposed brass plating.

A satisfactory rubber composition for this purpose may consist of about 45% of pale crepe rubber, 1.8% of sulphur, 21% of hard bitumen, 30% of zinc oxide, and the balance material selected from the group of plasticizers, accelerators and age and oxidation inhibitors of the types customarily used in such compositions. It will be noted that the sulphur in this composition is equal to 4% of the rubber content of the composition, although somewhat larger amounts of sulphur may be used, if desired. The sulphur content should be high enough to insure a firm bond between the vulcanized rubber composition and the brass plate on the stainless steel body.

The resulting composite article consists essentially of the stainless steel body and a body of rubber firmly adhered thereto by means of the brass plate. The tensile strength of the bond is unusually high, and considerable force is required to strip the rubber away from the stainless steel body. Composite articles produced in this manner may be used for many purposes where the corrosion resistance properties and strength of stainless steel are advantageous and where the inertness, resiliency and abrasion resistance of the rubber are useful.

Example II

A body of stainless steel containing 17% of chromium was cleaned in a fluosilicic acid bath of the type used in Example I, was brass plated in the manner described in Example I, and a body of rubber composition of the type referred to previously was vulcanized in contact with the brass plate under heat and pressure.

This procedure resulted in a composite article in which the principal constituents, namely the stainless steel body and the rubber body, were firmly bonded to each other by the intermediate brass plate. Such composite articles may be used with entire satisfaction where the combined properties of the stainless steel and the rubber bonded thereto are desirable.

Composite articles of this type, in which the metallic portion consists of stainless steel of any of the usual commercial varieties, may be made by following substantially the same procedures as were employed in Examples I and II.

In treating the stainless steel preparatory to applying the rubber body thereto, it may be cleaned electrolytically in an aqueous fluosilicic acid bath containing from about 10% to about 60% of fluosilicic acid, and the current density employed may vary from about 350 to about 540 amperes per square foot. The stainless steel body may be made an anode in such an electrolytic bath for periods ranging from about twenty seconds to about two minutes. The temperature of the bath should not exceed about 85° F., since above that temperature excess volatilization of the fluosilicic acid may occur. While it is preferable to make the stainless steel body an anode in the electrolytic cleaning bath, satisfactory results may be obtained when it is made a cathode therein.

After washing the electrolytically cleaned body of stainless steel in water to remove the electrolyte from the surface thereof, it is preferable, although perhaps not absolutely essential, to place the body in the brass plating bath while still wet. When the surface of a stainless steel body is treated electrolytically in a fluosilicic acid electrolyte, the surface thereof, which is normally passive, becomes active and a brass plate may be applied thereon readily. Apparently, if the electrolytically cleaned stainless steel surface is allowed to dry and to stand for any appreciable period of time before immersion in the brass plating bath, the stainless steel surface becomes passive again and it is then difficult, if not impossible, to obtain an adherent brass plate on the passive surface.

The composition of the alkaline cyanide brass plating bath should be maintained so as to deposit a coating of brass containing from about 70% to about 80% of copper, and preferably about 75% of copper. The copper to zinc ratio in the bath should be maintained at about seven to one. The other constituents of the bath also may vary somewhat. For example, the sodium carbonate content may range from about 6 to about 12 ounces per gallon and the uncombined sodium cyanide from about 2 to about 4 ounces per gallon. The pH of the bath should be closely controlled within the limits of 10.8 to 11.0, while the temperature of the brass plating bath is preferably maintained between 85° F. and 95° F.

Obviously, instead of an alkaline cyanide bath, other types of brass plating baths may be used without departing from the invention. The principal factor is the electroplating of a uniform brass coating containing about 75% of copper and any plating bath that will deposit such a coating on a clean, stainless steel surface may be used with satisfactory results.

Instead of using a rubber composition as the resilient or abrasion resistant material to be bonded to a stainless steel body, other vulcanizable compositions containing rubber-like compounds may be employed. Thus, for example, compositions in which the rubber-like constituent is polymerized chloroprene and which contain at least 4.0% of sulphur on the basis of the polymerized chloroprene content of the compositions may be employed. Polymerized chloroprene, which is sold under the name of "neoprene," has more resistance to oils and rubber solvents than does rubber itself. Consequently, composite articles consisting of a stainless steel body to which a body of "neoprene" composition is bonded by an intermediate coating of brass, may be used where the respective characteristics of the stainless steel and "neoprene" are important. The "neoprene" composition may be caused to adhere to the brass plate by subjecting it to heat and pressure in contact with the brass plate.

While "neoprene" compounds are not vulcanized by heat in the presence of sulphur, in the sense that this term is used with reference to rubber compounds, they do undergo a change that is analogous to vulcanization. Hence, the term "vulcanizing," as used herein and in the annexed claim, is intended to include the transformation which "neoprene" compounds undergo when heated.

Likewise, butadiene rubbers may be used instead of natural rubber in the vulcanizable compositions employed in the above-described processes to make useful composite articles. Among the butadiene rubbers that may be used are the "Buna" rubbers, which are the products obtained by polymerizing butadiene jointly with either styrene or acrylonitrile. It is preferable to employ in such compounds at least 4.0% of sulphur on the basis of the butadiene rubber present.

"Neoprene" and "Buna" rubbers are examples of vulcanizable rubber-like compounds that may be employed to make composite articles having a stainless steel base and a body of resilient rubber-like material bonded thereto by means of an intermediate brass coating. Other similar vulcanizable rubber-like materials, such as "Thiokol" and butyl rubbers, may be employed, if desired.

"Thiokol" is a trade designation of complex products obtained by the polymerization of sodium tetra sulphide with either or both of the compounds ethylene dichloride and dichloroethyl ether. "Thiokol" types of rubber-like compositions will be designated as "polysulphide rubbers".

Butyl rubbers are copolymers of isobutylene and small amounts of other unsaturated hydrocarbons, such as butadiene and isoprene.

In any event, the vulcanizable composition employed should contain enough reactive sulphur to cause the composition to form a strong bond with the brass plate. For the sake of simplicity, rubber and rubber-like compounds will be referred to as "elastomers." Obviously, vulcanizable compositions containing mixtures of such elastomers may be employed, if desired.

In the aforementioned copending application, Serial No. 432,149, there is disclosed a process for making insulated conductors in which a stainless steel conductor is first cleaned electrolytically by passing it through and making it an electrode in an electrolytic cell of the type described hereinabove, in which the electrolyte consists of a water solution of fluosilicic acid. The conductor is then passed, while still wet with the fluosilicic acid electrolyte, directly into a lead plating bath consisting of a solution of lead fluosilicate and free fluosilicic acid, wherein it is made the cathode to apply a lead plate thereon.

The conductor may be passed directly from the fluosilicic acid bath into the lead plating bath, without an intermediate rinse, because both baths contain fluosilicic acid and no foreign constituent is introduced into the lead plating bath. Not only does the presence of fluosilicic acid in both the electrolytic cleaning bath and the lead plating bath obviate the necessity of a wash bath between the cleaning and plating operations, but, in addition, the fluosilicic acid dragged out by the conductor from the fluosilicic acid cleaning bath aids in maintaining the requisite free acid concentration in the lead plating bath. By keeping the stainless steel conductor wet during its passage from the fluosilicic acid bath to the lead plating bath, the surface thereof is prevented from becoming passive before it is electroplated.

The lead plated conductor is rinsed with water to remove the lead plating electrolyte, and then is advanced as a cathode through a cyanide brass plating cell of the type described hereinabove to apply a brass plate upon the lead plated conductor. When the lead plated conductor is brass plated immediately after the lead plate has been applied, the lead plate has no opportunity to become corroded and no treatment to remove an oxide coating is necessary. After the brass plate has been applied, the conductor is insulated at any suitable time by applying and vulcanizing a rubber jacket upon the exterior of the brass plate.

For the purposes of this invention, it is immaterial whether the plating applied on the stainless steel article after it has been electrolytically cleaned in a fluosilicic acid electrolyte is lead, which is subsequently plated with brass, or is brass itself. In either event, the electroplated coating applied to the stainless steel article will not adhere firmly to the article unless the article is first treated electrolytically in the fluosilicic acid electrolyte.

What is claimed is:

The process for treating stainless steel articles, which comprises electrolyzing such an article as an anode at an anode current density of from about 350 to about 540 amperes per square foot in an electrolyte consisting of a water solution of fluosilicic acid of from about 10% to about 60% concentration for a period of from about twenty seconds to about two minutes while maintaining the electrolyte at a temperature not exceeding about 85° F., washing the thus-treated article with water, and making the wet article the cathode in a cyanide brass plating bath of such composition as to deposit thereon a brass plate containing from about 70% to about 80% of copper.

KENNETH M. HUSTON.

REFERENCES CITED

The following references are of record in the file of this patent:

UNITED STATES PATENTS

| Number | Name | Date |
|---|---|---|
| 215,034 | Adams | May 6, 1879 |
| 260,020 | Greacen | June 27, 1882 |
| 2,036,962 | Fischer | Apr. 7, 1936 |
| 2,227,454 | Kushner | Jan. 7, 1941 |
| 2,363,339 | Kraft et al. | Nov. 21, 1944 |
| 2,341,712 | Gray | Feb. 15, 1944 |
| 2,282,351 | Faust | May 12, 1942 |
| 2,115,005 | Blaut et al. | Apr. 26, 1938 |

FOREIGN PATENTS

| Number | Country | Date |
|---|---|---|
| 677,025 | Germany | Apr. 26, 1938 |

OTHER REFERENCES

Rubber Age, Nov. 1939, pages 266–268; Transactions of the Institution of the Rubber Industry, pages 25–38, Sept. 1943.

Schaefer, article in Metal Industry, Jan. 1940, pages 22–24.

The Metal Industry, Nov. 1925, pages 451, 452.

"Deposition of Metals Upon Stainless Steel" (in 204–34).